(12) United States Patent
McDaniel

(10) Patent No.: US 9,790,422 B2
(45) Date of Patent: Oct. 17, 2017

(54) PROPPANT MIXTURES

(71) Applicant: Preferred Technology, LLC, Radnor, PA (US)

(72) Inventor: Robert Ray McDaniel, Cypress, TX (US)

(73) Assignee: PREFERRED TECHNOLOGY, LLC, Radnor, PA (US)

( * ) Notice: Subject to any disclaimer, the term of this patent is extended or adjusted under 35 U.S.C. 154(b) by 0 days.

(21) Appl. No.: 14/266,179

(22) Filed: Apr. 30, 2014

(65) Prior Publication Data

US 2015/0315892 A1 Nov. 5, 2015

(51) Int. Cl.
| | | |
|---|---|---|
| *C09K 8/80* | (2006.01) | |
| *E21B 43/26* | (2006.01) | |
| *E21B 43/267* | (2006.01) | |
| *C09K 8/56* | (2006.01) | |

(52) U.S. Cl.
CPC ............... *C09K 8/80* (2013.01); *C09K 8/805* (2013.01); *E21B 43/26* (2013.01); *E21B 43/267* (2013.01); *C09K 8/56* (2013.01)

(58) Field of Classification Search
CPC ........ E21B 43/26; E21B 43/267; C09K 8/805
See application file for complete search history.

(56) References Cited

U.S. PATENT DOCUMENTS

| | | |
|---|---|---|
| 2,163,972 A | 6/1939 | Anderson |
| 2,366,007 A | 12/1944 | D'Alelio |
| 2,653,089 A | 9/1953 | Bulson |

(Continued)

FOREIGN PATENT DOCUMENTS

| | | |
|---|---|---|
| EP | 2469020 A1 * | 6/2012 |
| GB | 1294017 A | 10/1972 |

(Continued)

OTHER PUBLICATIONS

Boster, Ronald S., A Study of Ground-Water Contamination Due to Oil-Field Brines in Morrow and Delaware Counties, Ohio, With Emphasis on Detection Utilizing Electrical Resistivity Techniques, The Ohio State University, 1967.

(Continued)

*Primary Examiner* — Angela M DiTrani
*Assistant Examiner* — Crystal J Miller
(74) *Attorney, Agent, or Firm* — Pepper Hamilton LLP

(57) ABSTRACT

The invention relates to a propped, fractured, subterranean field with (a) a first proppant and (b) a second proppant that exhibits a relatively higher average crush strength and/or an ability to form a particle to particle bonded structure than the first proppant. Preferably, the first proppant is uncoated sand and the second proppant is resin-coated sand. The proppants can be deposited as a substantially homogeneous mixture or in layered structures (vertical or horizontal) within the fractured field. Deformation of the second proppant under closure stress acts to spread out the compression pressures in a mixture so as to reduce failure of the first proppant. Similar protective effects are found when the proppants are deposited in layers. When formed as vertical pillar structures, the second proppant structures can also act as in-situ screens that inhibit formation fines from migrating through the proppant pack to the detriment of field conductivity.

11 Claims, 1 Drawing Sheet

(56) References Cited

U.S. PATENT DOCUMENTS

| | | |
|---|---|---|
| 2,823,753 A | 2/1958 | Henderson |
| 3,026,938 A | 9/1958 | Huitt |
| 3,392,148 A | 7/1968 | Hunter |
| 3,763,072 A | 10/1973 | Krieger |
| 3,805,531 A | 4/1974 | Kistner |
| 3,817,939 A | 6/1974 | Allen et al. |
| 3,837,892 A | 9/1974 | Marzocchi |
| 3,900,611 A | 8/1975 | Corbett et al. |
| 3,929,191 A | 12/1975 | Graham |
| 3,931,428 A | 1/1976 | Reick |
| 3,971,751 A | 7/1976 | Isayama et al. |
| 3,976,135 A | 8/1976 | Anderson |
| 4,074,760 A | 2/1978 | Copeland |
| 4,113,014 A | 9/1978 | Kubens |
| 4,177,228 A | 12/1979 | Prolss |
| 4,199,484 A | 4/1980 | Murphey |
| 4,252,655 A | 2/1981 | Carney |
| 4,273,910 A | 6/1981 | Lederer |
| 4,417,992 A | 11/1983 | Bhattacharyya et al. |
| 4,443,347 A | 4/1984 | Underdown |
| 4,465,815 A | 8/1984 | Chattha |
| 4,493,875 A | 1/1985 | Beck et al. |
| 4,518,039 A | 5/1985 | Graham |
| 4,554,188 A | 11/1985 | Holubka et al. |
| 4,585,064 A | 4/1986 | Graham et al. |
| 4,592,931 A | 6/1986 | Cargle |
| 4,594,268 A | 6/1986 | Kirwin |
| 4,732,920 A | 3/1988 | Graham et al. |
| 4,746,543 A | 5/1988 | Zinkan et al. |
| 4,785,884 A | 11/1988 | Armbruster |
| 4,792,262 A | 12/1988 | Kapps et al. |
| 4,801,635 A | 1/1989 | Zinkan et al. |
| 4,822,425 A | 4/1989 | Burch |
| 4,920,192 A | 4/1990 | Wiser-Halladay |
| 5,048,608 A | 9/1991 | Wiser-Halladay |
| 5,092,404 A | 3/1992 | Falk et al. |
| 5,138,055 A | 8/1992 | Parekh |
| 5,181,957 A | 1/1993 | Gross et al. |
| 5,188,175 A | 2/1993 | Sweet |
| 5,194,174 A | 3/1993 | Roe et al. |
| 5,199,491 A | 4/1993 | Kutta |
| 5,218,038 A * | 6/1993 | Johnson et al. ............... 524/541 |
| 5,242,248 A | 9/1993 | Bramwell |
| 5,256,729 A | 10/1993 | Kutta |
| 5,264,572 A | 11/1993 | Endo et al. |
| 5,330,836 A | 7/1994 | Buese et al. |
| 5,420,174 A | 5/1995 | Dewprashad |
| 5,422,183 A | 6/1995 | Sinclair et al. |
| 5,480,584 A | 1/1996 | Urano et al. |
| 5,582,249 A | 12/1996 | Caveny |
| 5,597,784 A | 1/1997 | Sinclair et al. |
| 5,721,315 A | 2/1998 | Evans |
| 5,733,952 A | 3/1998 | Geoffrey |
| 5,824,462 A | 10/1998 | Ashida et al. |
| 5,837,656 A | 11/1998 | Sinclair et al. |
| 5,849,818 A | 12/1998 | Walles et al. |
| 5,856,271 A | 1/1999 | Cataldo et al. |
| 5,911,876 A | 6/1999 | Rose |
| 5,924,488 A * | 7/1999 | Nguyen ................ E21B 43/025 |
| | | 166/280.1 |
| 5,955,144 A | 9/1999 | Sinclair et al. |
| 6,071,990 A | 6/2000 | Yip et al. |
| 6,079,492 A | 6/2000 | Hoogteijling |
| 6,093,469 A | 7/2000 | Callas |
| 6,093,496 A | 7/2000 | Dominguez et al. |
| 6,114,410 A | 9/2000 | Betzold |
| 6,127,308 A | 10/2000 | Slack et al. |
| 6,187,892 B1 | 2/2001 | Markusch et al. |
| 6,207,766 B1 | 3/2001 | Doi et al. |
| 6,270,692 B1 | 8/2001 | Geissler et al. |
| 6,306,964 B1 | 10/2001 | Evans |
| 6,372,842 B1 | 4/2002 | Grisso et al. |
| 6,387,501 B1 | 5/2002 | McCrary |
| 6,406,789 B1 | 6/2002 | McDaniel |
| 6,486,287 B2 | 11/2002 | McGall et al. |
| 6,528,157 B1 | 3/2003 | Hussain |
| 6,582,819 B2 | 6/2003 | McDaniel |
| 6,632,527 B1 | 10/2003 | McDaniel |
| 6,668,926 B2 | 12/2003 | Nguyen |
| 6,705,400 B1 | 3/2004 | Nguyen |
| 6,732,800 B2 | 5/2004 | Acock et al. |
| 6,767,978 B2 | 7/2004 | Aubart et al. |
| 6,790,245 B2 | 9/2004 | Wolff et al. |
| 6,809,149 B2 | 10/2004 | Meyer et al. |
| 6,866,099 B2 | 3/2005 | Nguyen |
| 7,012,043 B2 | 3/2006 | Klein |
| 7,074,257 B2 | 7/2006 | Lockwood et al. |
| 7,078,442 B2 | 7/2006 | Brown |
| 7,129,308 B2 | 10/2006 | McGall et al. |
| 7,135,231 B1 | 11/2006 | Sinclair |
| 7,153,575 B2 | 12/2006 | Anderson |
| 7,157,021 B2 | 1/2007 | Bytnar et al. |
| 7,216,711 B2 | 5/2007 | Nguyen |
| 7,244,492 B2 | 7/2007 | Sinclair et al. |
| 7,261,156 B2 | 8/2007 | Nguyen |
| 7,270,879 B2 | 9/2007 | McCrary |
| 7,281,581 B2 | 10/2007 | Nguyen |
| 7,318,472 B2 | 1/2008 | Smith |
| 7,318,474 B2 | 1/2008 | Welton |
| 7,322,411 B2 | 1/2008 | Brannon |
| 7,326,346 B2 | 2/2008 | Lovell et al. |
| 7,332,089 B2 | 2/2008 | Harjula et al. |
| 7,334,635 B2 | 2/2008 | Nguyen |
| 7,334,783 B2 | 2/2008 | Yoneyama et al. |
| 7,343,973 B2 | 3/2008 | Dusterhoft |
| 7,344,783 B2 | 3/2008 | Shea |
| 7,350,571 B2 | 4/2008 | Nguyen |
| 7,407,010 B2 | 8/2008 | Rickman |
| 7,528,096 B2 | 5/2009 | Brannon |
| 7,537,702 B2 | 5/2009 | Lupton et al. |
| 7,624,802 B2 | 12/2009 | McCrary |
| 7,678,872 B2 | 3/2010 | Glass et al. |
| 7,721,804 B2 | 5/2010 | Duenckel |
| 7,726,399 B2 | 6/2010 | Brannon |
| 7,754,659 B2 | 7/2010 | Rediger |
| 7,772,163 B1 | 8/2010 | Brannon |
| 7,789,147 B2 | 9/2010 | Brannon |
| 7,803,742 B2 | 9/2010 | Bicerano et al. |
| 7,884,043 B2 | 2/2011 | Lisetskiy et al. |
| 7,896,080 B1 | 3/2011 | Watters et al. |
| 7,919,183 B2 | 4/2011 | McDaniel |
| 7,921,910 B2 | 4/2011 | Wilson et al. |
| 7,999,013 B2 | 8/2011 | Brown |
| 8,006,754 B2 | 8/2011 | Bicerano |
| 8,006,755 B2 | 8/2011 | Bicerano |
| 8,052,890 B2 | 11/2011 | Nguyen |
| 8,133,587 B2 | 3/2012 | Rediger et al. |
| 8,183,179 B2 | 5/2012 | Garcia-Lopez De Victoria et al. |
| 8,258,206 B2 | 9/2012 | Kanagasabapathy et al. |
| 8,298,667 B2 | 10/2012 | Smith et al. |
| 8,338,351 B2 | 12/2012 | Kanagasabapathy et al. |
| 8,349,911 B2 | 1/2013 | Kuehnle |
| 8,354,279 B2 | 1/2013 | Nguyen et al. |
| 8,360,149 B2 | 1/2013 | Hughes et al. |
| 8,431,220 B2 | 4/2013 | Wu et al. |
| 8,513,342 B2 | 8/2013 | Gao et al. |
| 8,763,700 B2 | 7/2014 | McDaniel et al. |
| 8,936,083 B2 * | 1/2015 | Nguyen ....................... 166/278 |
| 9,040,467 B2 * | 5/2015 | McDaniel et al. ............ 507/219 |
| 2001/0014453 A1 | 8/2001 | McGall et al. |
| 2002/0048676 A1 | 4/2002 | McDaniel |
| 2003/0102128 A1 | 6/2003 | Dawson et al. |
| 2003/0131998 A1 | 7/2003 | Nguyen |
| 2003/0196805 A1 | 10/2003 | Boney |
| 2003/0224165 A1 | 12/2003 | Anderson |
| 2004/0010267 A1 | 1/2004 | Nakamura et al. |
| 2004/0129923 A1 | 7/2004 | Nguyen et al. |
| 2004/0138343 A1 | 7/2004 | Campbell et al. |
| 2005/0018193 A1 | 1/2005 | Chilese et al. |

(56) References Cited

U.S. PATENT DOCUMENTS

| | | | |
|---|---|---|---|
| 2005/0019574 A1 | 1/2005 | McCrary | |
| 2005/0173116 A1 | 8/2005 | Nguyen et al. | |
| 2005/0274523 A1* | 12/2005 | Brannon | C09K 8/62 166/308.3 |
| 2006/0035790 A1 | 2/2006 | Okell et al. | |
| 2006/0073980 A1 | 4/2006 | Brannon et al. | |
| 2006/0157243 A1* | 7/2006 | Nguyen | C09K 8/805 166/280.2 |
| 2006/0241198 A1 | 10/2006 | Motz et al. | |
| 2007/0021309 A1 | 1/2007 | Bicerano | |
| 2007/0034373 A1 | 2/2007 | McDaniel | |
| 2007/0036977 A1 | 2/2007 | Sinclair et al. | |
| 2007/0066742 A1 | 3/2007 | Mhetar et al. | |
| 2007/0073590 A1 | 3/2007 | Cosentino et al. | |
| 2007/0088137 A1 | 4/2007 | Georgeau et al. | |
| 2007/0161515 A1 | 7/2007 | Bicerano | |
| 2007/0204992 A1 | 9/2007 | Davis | |
| 2007/0208156 A1 | 9/2007 | Posey | |
| 2007/0209794 A1 | 9/2007 | Kaufman | |
| 2007/0215354 A1 | 9/2007 | Rickman | |
| 2007/0228322 A1 | 10/2007 | Chaves et al. | |
| 2007/0289781 A1 | 12/2007 | Rickman et al. | |
| 2008/0011478 A1* | 1/2008 | Welton | C09K 8/508 166/280.2 |
| 2008/0063868 A1 | 3/2008 | Chung et al. | |
| 2008/0202744 A1 | 8/2008 | Crews | |
| 2008/0202750 A1 | 8/2008 | Rediger | |
| 2008/0230223 A1 | 9/2008 | McCrary | |
| 2008/0236825 A1 | 10/2008 | Barmatov et al. | |
| 2009/0044942 A1 | 2/2009 | Gupta | |
| 2009/0238988 A1 | 9/2009 | McDaniel | |
| 2010/0065271 A1 | 3/2010 | McCrary | |
| 2010/0196621 A1 | 8/2010 | Larson-Smith et al. | |
| 2010/0212898 A1 | 8/2010 | Nguyen et al. | |
| 2010/0282462 A1 | 11/2010 | Xu et al. | |
| 2010/0286000 A1 | 11/2010 | Huang | |
| 2011/0024129 A1 | 2/2011 | Turakhia et al. | |
| 2011/0053809 A1 | 3/2011 | Sanders et al. | |
| 2011/0120719 A1 | 5/2011 | Soane et al. | |
| 2011/0162837 A1 | 7/2011 | O'Malley | |
| 2011/0244125 A1 | 10/2011 | Weisenberg | |
| 2011/0272146 A1 | 11/2011 | Green | |
| 2011/0297383 A1 | 12/2011 | Tanguay | |
| 2012/0018162 A1 | 1/2012 | Tanguay | |
| 2012/0277130 A1 | 11/2012 | Usova | |
| 2012/0279703 A1 | 11/2012 | McDaniel et al. | |
| 2012/0283153 A1* | 11/2012 | McDaniel et al. | 507/219 |
| 2012/0322925 A1 | 12/2012 | Arigo et al. | |
| 2013/0005856 A1 | 1/2013 | Phonthammachai et al. | |
| 2013/0037048 A1 | 2/2013 | Edgington et al. | |
| 2013/0045901 A1 | 2/2013 | Bicerano | |
| 2013/0048365 A1 | 2/2013 | Kim et al. | |
| 2013/0065800 A1* | 3/2013 | McDaniel et al. | 507/219 |
| 2013/0081812 A1 | 4/2013 | Green et al. | |
| 2013/0164449 A1 | 6/2013 | Tadepalli et al. | |
| 2013/0184381 A1 | 7/2013 | Bilodeau et al. | |
| 2013/0186624 A1 | 7/2013 | McCrary et al. | |
| 2013/0203917 A1 | 8/2013 | Harris et al. | |
| 2013/0233545 A1 | 9/2013 | Mahoney et al. | |
| 2013/0312974 A1 | 11/2013 | McClung, IV | |
| 2014/0060826 A1* | 3/2014 | Nguyen | 166/280.1 |
| 2014/0162911 A1 | 6/2014 | Monastiriotis et al. | |
| 2014/0262247 A1 | 9/2014 | Duenckel et al. | |
| 2014/0274819 A1 | 9/2014 | McCrary et al. | |
| 2014/0305650 A1 | 10/2014 | Song et al. | |

FOREIGN PATENT DOCUMENTS

| | | |
|---|---|---|
| WO | 2005121272 A1 | 12/2005 |
| WO | 2010049467 | 5/2010 |
| WO | 2013048365 A1 | 4/2013 |
| WO | 2013112251 A1 | 8/2013 |

OTHER PUBLICATIONS

Carbo Ceramics, Topical Reference, Physical Properties of Proppants, pp. 1-5.

EPA, Oil and Gas Extraction, Compliance and Enforcement History, Sector Notebook Project, Oct. 2000, pp. 115-155.

Halimoon, Normala, Removal of Heavy Metals from Textile Wastewater Using Zeolite, EnvironmentAsia 3(special issue) 2010, 124-130.

Hui, Removal of mixed heavy metal ions in wastewater by zeolite 4A and residual products from recycled coal fly ash, Journal of Hazardous Materials, Aug. 1, 2005, vol. B127, pp. 89-101.

Huntsman, JEFFCAT Amine Catalysts for the Polyurethane Industry—Americas Region.

Huntsman, Performance products JEFFCAT catalysts for the Polyurethane Industry—Asia-Pacific, pp. 1-6.

Huntsman, The JEFFAMINE Polyetheramines, 2007.

International Search Report and Written Opinion issued in PCT/US2012/053277 dated Nov. 20, 2012.

Interstate Oil and Gas Compact Commission and ALL Consulting, A Guide to Practical Management of Produced Water from Onshore Oil and Gas Operations in the United States, Oct. 2006.

Sanchez, Mariano, FRAC Packing: Fracturing for Sand Control, Middle East and Asia Reservoir Review, Nov. 8, 2007, pp. 37-49.

The removal of heavy metal cations by natural zeolites, http://www.resultsrna.com/research/zeolite.sub.--binds.sub.-- heavy.sub.---metals.php, pp. 3-7.

Wikipedia, Ion-exchange resin, en.wikipedia.org/wiki/Ion.sub.--exchange.sub.--resins, pp. 1-5.

Wikipedia, Methylene diphenyl diisocyanate, http://en.wikipedia.org/wiki/Methylene.sub.--diphenyl.sub.--diisocyanate.

Wikipedia, Piezoelectricity, en.wikipedia.org.wiki/Piezoelectricity, pp. 1-15.

Wingenfelder, Ulla et al., Removal of Heavy Metals from Mine Waters by Natural Zeolites, Environ. Sci. Technol., 2005, vol. 39, 4606-4613.

Cao et al., Mesoporous SiO2-supported Pt Nanoparticles for catalytic application, ISRN Nanomaterials, 2013, Article ID 745397, 7 pages.

Kuang et al., Controllable fabrication of SnO2-coated multiwalled carbon nanotubes by chemical vapor deposition, Carbon 2006 44(7):1166-1172.

Madaan and Tyagi, Quaternary pryidinium salts: a review, J Oleo Sci 2008 57(4):197-215.

Mellaerts et al., Enhanced release of itraconazole from ordered mesoporous SBA-15 silica materials, Chem Commun 2007 7(13):1375-7.

Notice of Allowance dated Dec. 22, 2015 in U.S. Appl. No. 13/626,055.

Non-Final Office Action dated Mar. 18, 2016 in U.S. Appl. No. 13/355,969.

Non-Final Office Action dated Apr. 5, 2016 in U.S. Appl. No. 14/314,573.

Non-Final Office Action dated Apr. 5, 2016 in U.S. Appl. No. 13/897,288.

AkzoNobel Declaration of Compliance Bindzil CC401, Eka Chemical, Jan. 27, 2010, pp. 1-4.

AkzoNobel Silane Modified Colloidal Silca Bindzil CC in Waterborne Coating Applications Use and Benefits, 2011, pp. 1-6.

International Search Report and Written Opinion issued in PCT/US2012/036093 dated Aug. 14, 2012.

International Search Report and Written Opinion issued in PCT/US2012/047519 dated Nov. 2, 2012.

International Search Report issued in PCT/US2012/070844 dated Mar. 8, 2013.

Official Action datd Nov. 30, 2015 from U.S. Appl. No. 14/798,774.

Polyurethanes, Ullmann's Encyclopedia of Industrial Chemistry, 2012, vol. 29.

Final Office Action dated Apr. 29, 2016 in U.S. Appl. No. 14/798,774.

* cited by examiner

PROPPANT MIXTURES

FIELD OF THE INVENTION

The invention relates to mixed, layered or sequential proppant structures in a subterranean field for the reduction of proppant crushing and control of fines movement along the fractured, propped field. The invention relates to the use of mixed proppants, or the layered or sequential addition of two or more proppants. The resulting packed fracture configuration is more resistant to proppant crushing and better control of fines migration that can reduce the packed fracture's ability to maximize well productivity.

BACKGROUND OF THE INVENTION

Several high strength proppants are available on the market. While these proppants have superior crush strength relative to frac sand, they are considerably more expensive so the question presented to the producer is one of pure economics balancing proppant failure against cost and productivity. In some cases, the economics of using the superior proppant may be marginal so alternative methods become attractive. One such alternative is a modification of the proppant schedule to place a regular strength proppant deep in the fracture and a high strength proppant next to the wellbore where closure stresses will be greatest. The term "tail in" has become used to describe the use of a different proppant in the final proppant stage of a multifracture treatment. Therefore a "tail-in" is pumped either to control proppant flowback, maximize conductivity nearest the wellbore, or both.

Fines are a problem in hydraulic fracturing of wells to recover trapped oil and gas. Fines can come from loosely consolidated strata, such as sandstone, whose grains flow into the well along with the oil and gas. The fracturing process itself can create fine pieces of rock and strata that enter liquid flow streams towards the wellbore. The substantial pressures and harsh environment within the field can also cause proppants to fail and generate fines, particularly during cyclic shut-in periods. The high stress exerted on the proppant pack can also lead to the embedment of the proppant pack into the faces of the created fractures. This embedment process will itself creates fines that can enter the proppant pack and be transported toward the wellbore. Portions of these fine materials are sufficiently small that they can become entrained in the water, oil and gas streams that move under pressure towards the relatively lower pressure wellbore. These fine materials will increase in concentration as they move along the fracture toward the wellbore and can ultimately clog desirable pore openings and channels to the detriment of the well's conductivity. Gravel packs and screens have been used around the wellbore to help protect, among other things, against loss of conductivity from fines movement.

Others have addressed the issue of fines generation and protecting the propped field against loss of conductivity and/or permeability that can occur with the movement of the fines during production.

WO 2012/085646 includes a detailed background discussion of hydraulic fracturing terminology and techniques and specifically teaches the sequential use of a fine proppant followed by a re-opening of the fractures and introduction of a larger proppant. However in this approach a smaller sized proppant is to be placed along the fracture faces specifically to minimize the entry of formation fines into the proppant pack. It is not designed nor can it be expected to address the generation of fines (from proppant crushing) or the control of movement of the fines (that are in the packed fracture) during production of the well. Such a process uses the fine proppant to hold open small cracks so that they can be re-expanded in the re-fracking step to a size sufficient for the larger proppant.

In its 2005 paper "Conductivity Endurance", Halliburton describes the adverse effects of fines penetration into proppant packs with the attendant reduction in conductivity. On pages 23-24, five mechanisms of particle deposition are presented: (1) surface deposition of particles, (2) pore-throat bridging and accumulation, (3) internal cake formation, (4) external cake formation, and (5) infiltration sedimentation. The solutions proposed in the paper included the use of (a) resin coated sands, (b) mechanical exclusion methods such as mechanical screens or the "frac-packing technique", and (c) chemical treatments that include (i) a proprietary surface modification agent designed to form a tacky exterior coating, (ii) chemical flocculants, (iii) organic cationic polymers, (iv) inorganic polymers, (v) oil-wetting surfactants, and (vi) clay stabilizing agents.

The 2007 article "Frac Packing: Fracturing For Sand Control", *Middle East & Asia Reservoir Review*, Number 8, pp. 36-49 (2007) describes the frac-packing technique for controlling fines as the simultaneous fracturing of the well with the formation of the gravel pack to hold back formation sand behind a pre-positioned screen that holds back the gravel.

A 1992 paper entitled "Fracture Conductivity Loss Due to Proppant Failure and Fines Migration", CIM 1992 Annual Technical Conference, Calgary, Canada (Jun. 7-10, 1992) reports on the effects of fines migration on a proppant pack containing two different proppants simulating tail-ins. As noted on page 3 of that article, tests were performed to simulate the placement of sand in the front end of a fracture and a higher strength proppant nearest the wellbore, i.e., a tail-in.

The disclosures of the above references and all other references mentioned in this document are hereby incorporated by reference.

It would be desirable to have a method that helped to minimize proppant failure that contributes to the presence of fines and for controlling the movement of fines in the fractured field through the proppant pack and, ultimately, to the wellbore and any screens or gravel pack found there so as to maintain conductivity through the fractured field.

It would also be desirable to have a fines control system that did not require that well operators add expensive, new equipment or systems in order to achieve better fines control and maintained conductivity.

SUMMARY OF THE INVENTION

It is an object of the invention to provide a method for forming a propped fracture field for the production of oil and/or gas that uses a combination of proppants to reduce fines generation from crushed proppants.

It is another object of the invention to provide a segmented structure of proppants within a fractured subterranean field that helps to control the generation of fines from crushed proppant and, optionally, to control the migration of fines within the fractured field.

In accordance with this and other objects of the invention that will become apparent from the description herein, the present invention comprises a method for forming proppant structures in a fractured subterranean field by steps that comprise injecting appropriately sized first proppants and second proppants into the fractured field whereby said second proppant solids exhibit a higher average crush strength than the first proppants.

The method of the present invention can be used to introduce a mixture of first and second proppants, or to sequentially introduce the first and second proppants into the fractured field. Depending on how the respective proppants are introduced and what type of fracturing fluid is used to place the proppant, the resulting propped, fracture field can exhibit reduced crushing of proppants and the attendant reduction in created fines from failed proppants and a structure that can inhibit the migration of produced fines if adjacent layers of proppants are positioned vertically with respect to one another and remain in such a configuration as a form of in-situ screen after the fracture has closed and closure stress is applied to the proppant pack. The result of such fines control is the maintenance of conductivity over a longer period than might be experienced without the present invention. A mixture of first and second proppants can be used to reduce crushing and intermittent segments of a stronger proppant (preferably resin coated) to restrict fines movement. Preferably, the stronger second proppant is also capable of bonding with other, adjacent, second proppants. With the most preferred embodiment of the invention, at least a portion of the migrating fines adheres to the proppant coating.

DETAILED DESCRIPTION OF THE INVENTION

The present invention uses a combination of first and second proppants in a mixture or in layers (horizontal and/or vertical) to control the generation of fines and/or their migration within a propped subterranean, fracture field.

Figure 3:
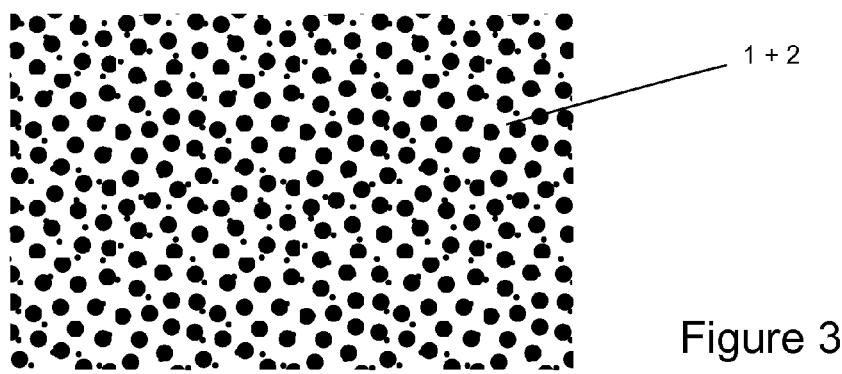
FIG. 3 depicts a mixture of two types of proppants according to the invention.

When mixed substantially homogeneously (see FIG. 3), the second proppant 2 of higher crush strength acts to protect the relatively less strong first proppant 1 from failure. In the context of a preferred embodiment using a mixture of uncoated sand (first proppant 1) and resin-coated sand (second proppant 2) of substantially equivalent size range, the greater the percentage of resin coated sand that is mixed with the uncoated sand, the greater the decrease in failure of the uncoated sand. Without wishing to be bound by theory, it appears that the presence of the resin coated sand in the pack protects the uncoated sand.

The coating on the resin coated proppant is known in the art to improve crush resistance by increasing the area of the contact points of the grains in contact. This increase in contact area effectively reduces the point load on the proppant grains that normally would be sufficient to cause grain failure. In the present invention, the coating of a resin coated proppant is also used to protect an uncoated grain that is in contact with the coated grain in a similar manner. While not wishing to be bound by theory, the coating on the coated grain likely deforms at the contact point with the uncoated grain. This deformation increases the contact area of the two grains which effectively decreases the point loading that is exerted on the grains in contact. The fact that each coated grain can be in contact with multiple uncoated grains, means that the improvement in crush resistance can be achieved by addition of far less than a 1:1 mixture of coated and uncoated sand grains. For example a 20-30% of coated sand decreased the crush of the mixture by 50% as compared to a pack of 100% uncoated sand.

Figure 1:
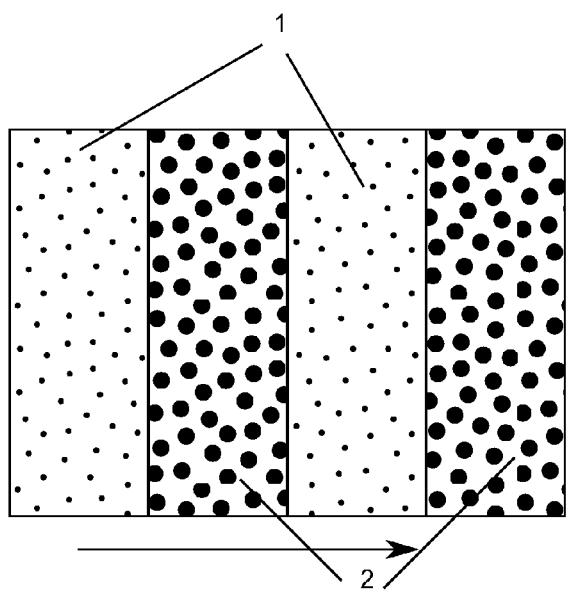
FIG. 1 shows the formation of a propped fracture with a vertically layered structure. Note: All figures are representing side views of the packed fractures. Proppant 1 and 2 could be a similar size or different sizes.

To achieve the vertical proppant pillar structures (shown in FIG. 1) it is necessary to use a gel, crosslinked or hybrid frac fluid that is capable of perfect proppant transport (doesn't allow proppant to settle while the slurry is being transported along the created fracture) throughout the fractured subterranean field. The first proppant 1 and second proppant 2 are sequentially injected with a higher viscosity frac fluid into the fractured field to form vertical pillars or segments that extend from top to bottom in the fracture but which grow horizontally with subsequent injections of proppant. (See FIG. 1.) The second proppant pillars can carry a greater compressive load and thereby protect the intervening first proppant from failure. It is also likely that using a higher proppant concentration for the stronger proppant could effectively allow those columns of proppant to decrease the stress load on the adjacent columns of weaker proppant. It is also likely that it would be beneficial to make the stronger proppant either slightly larger or smaller than the weaker proppant to either increase the stronger proppant's ability to resist stress, increase overall conductivity or to better control the movement of fines through the proppant pack.

The pillar-type structure of alternating or substantially alternating proppants (e.g., injecting 50,000 lb of sand followed by 21,000 lb of resin coated sand and then repeating this sequence which would represent a ratio of uncoated sand to coated sand of approximately 70% sand to 30% resin coated sand) also serves as a series of in-situ screening segments of consolidated proppants that limit migration of formation fines moving from within the fractured field towards the wellbore.

In the pillar-type structure embodiment, the fracturing and propping process is performed by sequentially introducing a conventional cross-linked or hybrid frac fluid with first proppant and then a second frac fluid containing second proppant. This cycle of first-then-second-proppant injections is repeated a plurality of times, preferably at least twice, and even more preferably at least four times until the fractured field has been substantially fully loaded with proppants and is ready for tail-in and finishing steps. Ideally it is preferred that such a sequencing would be designed to end up with the stronger proppant (in this case the resin coated sand) closest to the wellbore to take advantage a of high conductivity near the wellbore and to keep the proppant occupying the near wellbore part of the fracture from being pulled out of the fracture by produced fluids. If the stronger proppant is not capable of forming a consolidated matrix then one will still have the most conductive part of the proppant pack nearest the wellbore but there will be no ability to insure that proppant (from the fracture) will not be produced out of the fracture when the well is placed on production.

Fracturing fluids can have a wide range of viscosities ranging from foams to crosslinked fluids. Various chemicals are used to generate increased viscosity to aid in generating fracture width, proppant suspension and transport. It is the combination of fluid viscosity and velocity that is used to create the fracture and transport the proppant into the fractured subterranean field. The process typically uses a "pad" fluid that initiates fracture growth followed by continuous introduction of an increasing concentration of proppant in the fracturing fluid.

As is understood in the art, fines capable of damaging proppant packed fractures can include fine solids formed from the strata during the fracturing or proppant embedment process as well as crushed proppants, such as crushed first proppant.

Figure 2:
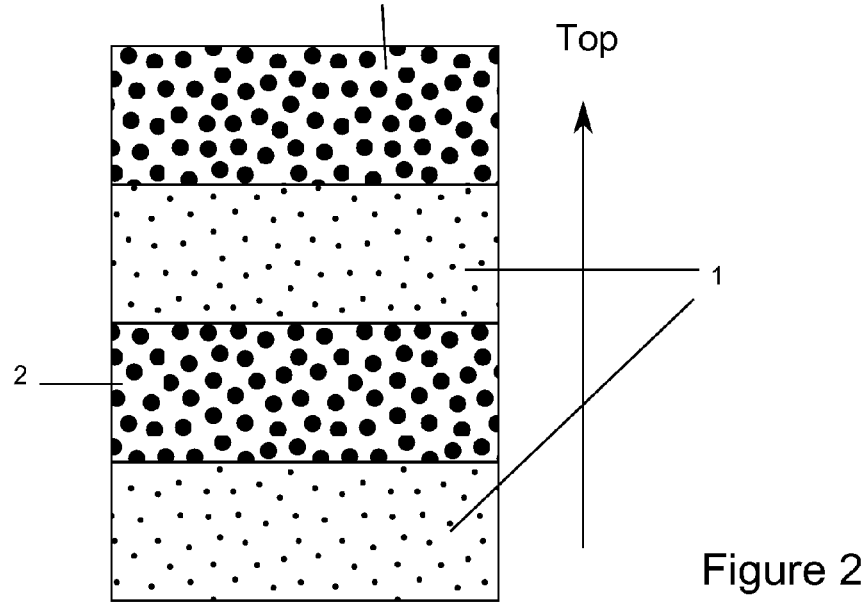
FIG. 2 illustrates a propped fracture with a horizontally layered structure.

Another embodiment according to the invention contemplates the formation of horizontally extending layers of first proppant and then second proppant that are disposed vertically adjacent (FIG. 2). This structure is formed by pumping sequences of uncoated sand (first proppant 1) and resin-coated sand (second proppant 2) in water, slick water frac fluid, or other frac fluid that will build up a proppant bank as the injection proceeds. Another way of referring to such frac fluids is that they are systems that are incapable of perfect proppant transport (e.g., uniform, high transport) or systems that allow at least a portion of the proppant to settle during transport. This type of treatment will create an uncoated sand segment starting at the bottom of the fracture and build vertically upwardly with successive proppant deposits. Such a deposition process is called building a proppant "bed". When the resin-coated sand (the second proppant) is subsequently introduced, horizontal layers of the second proppant are formed within the fractured subterranean strata and distant from the wellbore that are vertically on top of the uncoated sand below. Such a vertically-layered structure allows the resin-coated sand to help reduce failure of the uncoated sand but is not as effective at controlling the migration of formation fines from within the fracture towards the wellbore.

The formation of horizontal layers containing the relatively stronger proppant permit the formation of higher conductivity, horizontal channels within the field. Such channels can be used to interconnect high conductivity areas, provide alternate channels for production, or form other structures for enhancing conductivity from the fractured field.

A Slick Water Frac is an hydraulic fracturing fluid with a very low viscosity. Chemicals or gelling agents are used for friction reduction, not proppant suspension and transport. Thus, velocity, not viscosity, is used to place proppant within the fractured field. The fluid/proppant injection rates tend to be high and could have alternating stages of proppant introduction followed by fluid "sweeps" that are free of proppant. A slick water frac doesn't contain high levels of gelling agents and uses, instead, friction reducers. This water is composed of 98-99% water (by volume), 1-1.9% proppant (by volume) and the remainder a variety of chemicals. The chemicals in a slick water frac fluid typically include one or more of the following:

Friction reducers, or a form of non-acidic polyacrylamide (0.025% by volume). This substance is used in baby diapers for its ability to absorb fluids. It is used during fracking to reduces the horsepower at which pumps have to function, which helps reduce air emissions. Other natural polymers such as guar gum can be used.

Disinfectants, also known as biocides, these chemicals make up 0.05-0.005%, by volume, of slick water frac. These biocides help limit the growth of microbes that could lead to the creation of sour gas, or destroy frac fluids. Currently, scientists are working on developing biodegradable biocides. The following biocides are commonly used in fracking and are both found in hospitals, municipal water systems, and over-the-counter skin antiseptics.

Glutaraldehyde

Quaternary amine

Surfactants which prevent and break emulsions, and modify the surface tension.

Thickeners, or gelation chemicals, are used in hybrid frac fluids and include common food additives such as cellulose polymers and guar gum. These chemicals are not concerning because they do not break down in toxins.

Scale inhibitors are used in varying amounts depending on the shale formation and include phosphonates, phosphate esters and polymers. All three of these chemicals are similar to detergent and are non-toxic in the amounts used at fracking sites.

Hydrochloric acid may be used at some sites to reduce pressure when first cracking into the shale rock. This acid is used up within the first few inches of drilling into the rock. No acid returns to the surface and instead the hydrochloric acid is returned into water, some CO2 and calcium chloride. The hydrochloric acid levels seen in frac fluid are slightly higher than those seen in swimming pool water.

Corrosion inhibitors are one of the few potentially toxic, organic compounds used in fracking. These inhibitors are not always used; their use varies from formation to formation. Most of these inhibitors, 90-90% are absorbed into the steel used during the fracking process.

The first proppant can be selected from a wide variety of proppant materials, including uncoated sand, lower density ceramic particles (for instance, aluminum oxide, silicon dioxide, titanium dioxide, zinc oxide, zirconium dioxide, cerium dioxide, manganese dioxide, iron oxide, calcium oxide or bauxite), composite proppants (see U.S. Pat. No. 8,466,093) or also other granular materials. Uncoated sand is preferably used as the first proppant in a preferred embodiment of the present invention.

The first proppants preferably have an average particle size within the range from about 50 μm to about 3000 μm, and more preferably within the range from about 100 μm to about 2000 μm.

The second proppant should be a proppant having a relatively higher average crush strength than the first proppant. Such proppants can include resin coated sand, intermediate and/or higher density ceramics, and the like. The desired size is generally substantially the same as the size range of the first proppant, depending on the nature of the second proppant, it is possible to use a somewhat smaller or larger size range for the second proppant to maximize field conductivity and/or minimize fines movement through the overall proppant pack.

The coating used on the sand in the second proppant can be selected from a wide variety of coatings, including phenolic resins, partially cured resin coatings, curable resin coatings, polyurethane, polyurea, and polycarbodiimide. Polyurethane and/or polyurea coatings on sand are generally preferred for the present invention for their ability to become substantially fully cured yet retain the ability to deform and consolidate with good inter-proppant bond strengths. See, US 2012/0279703; 2012/0283153; 2013/0056204; 2013/0065800; and 2013/0186624 for disclosures related to the manufacture of proppants with polyurethane and/or polyurea coatings. See U.S. Pat. No. 5,597,784 and copending U.S. patent application Ser. No. 14/015,629 entitled "Proppant With Composite Coating" for various types of composite and reinforced proppant coatings to increase the average crush strength of the proppant. The disclosures of these references are hereby incorporated by reference. It would be also be desirable if the proppant coating under downhole conditions had the ability to have migrating fines stick to the coating surface.

The relative volumes and amounts of first and second proppants used in the present invention can vary within wide limits and will generally fall within the overall volumes that would conventionally be used for a particular type of fractured field. In general, the volume of first proppant is within the range from about 1-99% (v/v), and preferably within the range from about 35-95% (v/v) of the total volume of proppant pumped. The volume of second proppant is within the range from about 1-99% (v/v), and preferably within the range from about 5-65% (v/v) of the total volume of proppant pumped.

Preferred tail-in designs after introduction of the first and second proppants according to the invention use 10-30% of a resin-coated sand following behind 70-85% uncoated sand.

The injection of proppants according to the invention are preferably performed to place the proppant mixture or form the desired proppant layer structures deep within the fractured subterranean strata. Such a distributed presence within the fracture field, e.g., 5-100%, preferably 10-90% of the total fracture field distance from the wellbore, as opposed to a tail-in location that is very near or adjacent the wellbore, helps maintain the conductivity of the fractured field by reduced formation of fines throughout the treated field. If the proppant layers are formed as vertical pillars, as in FIG. 1, the pillars of the treated field can also act as in-situ screens for controlling the migration of formation fines toward the wellbore.

The treated fracture field formed by the present invention can be finished with a tail-in of third proppants that exhibit a higher average crush strength than the second proppants. Such tail-in materials include ceramic proppants of the same or larger size than the second proppants. These tail-in materials are introduced at the final stages of injection so that the third proppants become disposed near or adjacent the wellbore gravel screen.

Preferably, the tail-in pumps in a relatively small amount of 100 mesh sized solids to pack naturally occurring fractures, followed by an uncoated sand, and finally a coated sand or uncoated ceramic. This is consistent with conventional proppant treatments that use an uncoated sand as the proppant followed by a tail-in with either a highly conductive ceramic or a resin-coated sand that can generate a highly conductive area near the wellbore, consolidate to prevent flowback of proppant, or both. In some aspect, the specific selection of a relative proportion of first and second proppants can become an economic choice that balances the generally lower cost of uncoated sand (first proppant) against the benefits from the somewhat more valuable coated sand (second proppant). The key to deciding the optimum ratio between proppant 1 and proppant 2 is to take into account the following factors:

1) The expected production rate of the well being treated;
2) Whether the well is expected to produce back proppant;
3) The ability of the fracture fluid to transport proppant effectively;
4) A realistic conductivity value at the application conditions for the proppant being considered;
5) Whether the packed fracture can move the produced fluids faster than they can enter the fracture through the fracture faces (the goal should always be to have the factor controlling production rate not be the conductivity of the proppant in the packed fracture); and
6) An understanding of the economics of hydrocarbon being produced so that it can easily be determined how changes in the ratio of the two proppants will impact how quickly the cost of the fracturing treatment can be recovered.

Understanding factors 1-6 above allows the well engineers to make an educated choice about the proppant or proppants used. If the well is likely to produce proppant back then the engineer will need to design the treatment to at least have a tail-in of a coated sand or ceramic. To properly control proppant production, the engineer will likely need to have a tail-in of coated proppant that makes up a minimum of 10-20% of the total proppant pumped. To properly place the tail-in so that it fills the highest amount of area near the wellbore, the engineer will likely need to choose or design a fracturing fluid that is capable of high proppant transport. Once these items are accounted for, the engineer can look at the benefit of using higher ratios of second, stronger proppant. The optimum balance of proppant ratios depends on whether increasing the amount of second proppant will significantly improve the ability of the packed fracture to: (a) produce at higher rates thereby decreasing the time to pay for the fracturing treatment; or (b) produce at economic rates for a longer time thereby impacting the total volume of hydrocarbon recovered from the well over its production life.

EXAMPLES

Examples 1-10

Examples 1-10 demonstrate the effects on crush resistance when mixing uncoated proppant sands with coated proppant sands in the same fracture field. Each type of proppant sand is premeasured to fall within a 20/40 mesh size that is typical for proppant sands. Examples 1-4 show the effects of mixing these disparate proppants substantially uniformly. Examples 5-8 demonstrate the effects of a layered structure such as would be formed after sequentially introducing the disparate proppants into the same fractured field. Each test was performed twice in a simulated fracture field by preparing representative samples of each and subjecting the sample to 10,000 psi to simulate the pressures typical of deep wells. At the end of each test, the sample was recovered and tested for the formation of undersized fines. Table 1 summarizes the pertinent data.

TABLE 1

| Ex. | Structure | Proppant | % Crushed at 10k psi | Avg % Crushed at 10k psi | Ratio of Crushed to 100% Uncoated |
|---|---|---|---|---|---|
| 1 | Mixed | 80% uncoated + 20% coated | 15.94% 16.14% | 16.04 | 0.59 |
| 2 | Mixed | 70% Uncoated + 30% coated | 12.46% 12.89% | 12.68 | 0.47 |
| 3 | Mixed | 60% Uncoated + 40% Coated | 10.23% 10.43% | 10.33 | 0.38 |
| 4 | Mixed | 50% Uncoated + 50% Coated | 9.11% 8.91% | 9.01 | 0.33 |
| 5 | Layered | 10% Coated/ 80% Uncoated/ 10% Coated | 25.51% 25.11% | 25.31 | 0.93 |
| 6 | Layered | 15% Coated/ 70% Uncoated/ 15% Coated | 16.89% 17.80% | 17.35 | 0.64 |

TABLE 1-continued

| Ex. | Structure | Proppant | % Crushed at 10k psi | Avg % Crushed at 10k psi | Ratio of Crushed to 100% Uncoated |
|---|---|---|---|---|---|
| 7 | Layered | 20% Coated/ 60% Uncoated/ 20% Coated | 13.11% 14.17% | 13.64 | 0.50 |
| 8 | Layered | 10% Coated/ 35% Uncoated/ 10% Coated/ 35% Uncoated/ 10% Coated | 16.40% 15.54% | 15.97 | 0.59 |
| 9 | Uncoated sand* | 20/40 Blair uncoated | 27.23% | 27.23 | 1.00 |
| 10 | Resin-coated sand** | 20/40 PU Coated | 4.06% | — | — |

*Blair uncoated proppant sand
**PEARL brand of coated sand from Preferred Sands, LLC, Radford, PA An analysis of the data in table 1 shows that increasing amounts of resin coated sand reduces the proportion of crushed proppant and the corresponding amount of formation fines.

While not wishing to be bound by theory, it appears that the resin-coated sand in mixtures or layered structures (as in FIG. 1) serves to protect the uncoated sand against failure. The data in Table 1 show that physical mixtures seem to work well at lower than expected ratios, e.g., the presence of 30% of the resin-coated sand cuts in half the amount of crushed, uncoated sand. One potential explanation is that the resin coating deforms to spread out the closure stress applied to the proppant grains. The coating of the resin-coated sand appears to serve a similar benefit to adjacent proppants and any uncoated proppants in the vicinity. Since each coated grain can be in contact with multiple uncoated grains, even a small amount of coated proppants can reduce the crush stress on multiple grains simultaneously and result in lower failure rates.

The data in Table 1 shows that the resin-coated sand proppants can be used to reduce the overall generation of fines when substantially homogeneously mixed with uncoated sand or if placed in alternating segments. Alternating segments (of uncoated sand and coated sand can be used as fines control regions that would act like a series of screens or filters that would control the migration of crushed proppant fines flowing toward the wellbore from upstream in the propped fracture field. The use of one or more, e.g., 1-40, of such vertically-disposed, horizontally-alternating, fines control regions at intervals along and throughout the propped fracture field could help to maintain well conductivity by controlling the migration of fines through the propped field to the wellbore where the bore openings can become clogged with fines so as to reduce or preclude well conductivity in that region.

Those skilled in the art will appreciate that the examples presented herein are intended as illustrative and as a tool for understanding the invention rather than a limitation on the scope of the appended claims.

What is claimed is:

1. A method for forming a propped, subterranean, hydraulically-fractured field in an oil or gas well by steps that comprise:
   injecting into the fractured field simultaneously with a fracturing step or shortly thereafter a volume of first proppant and a volume of second proppant exhibiting a higher average crush strength relative to said first proppant,
   wherein the first proppant and the second proppant are substantially the same size,
   wherein the first proppant is an uncoated proppant,
   wherein the second proppant is a resin-coated proppant,
   wherein the injecting into the fractured field comprises injecting:
   (i) a mixture of the first and second proppants, wherein the amount of the second proppant is about 10-30% and the amount of the first proppant is about 70-85%; or
   (ii) repeatedly and sequentially injecting the first volume of proppants and then injecting the second volume of proppants for at least two cycles of such alternating injections to form a layered structure in the horizontal or vertical direction of first proppants and second proppants within the fractured subterranean field and distant from a wellbore wherein the amount of the second proppant is about 10-30% and the amount of the first proppant is about 70-85%.

2. The method according to claim 1 wherein said resin-coated sand comprises a polyurethane-coated sand.

3. The method according to claim 1 wherein said resin-coated sand comprises a polyurea-coated sand.

4. The method according to claim 1 wherein said resin-coated sand coating comprises a phenolic, epoxy or a combination of resins.

5. The method according to claim 1 wherein said resin-coated sand comprises a polyurethane coating and a polyurea coating.

6. The method according to claim 1 wherein the first proppant is injected as a mixture with said second proppant.

7. The method according to claim 1 wherein said first and second proppants are sequentially injected to form a series of vertically-disposed proppant layer structures that vary horizontally towards said wellbore and which are effective to control formation fines migration.

8. The method according to claim 7 wherein the injecting step is performed with crosslinked frac fluid.

9. The method according to claim 1 wherein said first and second proppants are sequentially injected to form a series of horizontally-disposed proppant layer structures that vary vertically within a fracture.

10. The method according to claim 9 wherein the injecting step is performed with water or slick water frac fluid.

11. A method for forming a propped, subterranean, hydraulically-fractured field in an oil or gas, the method comprising repeatedly and sequentially injecting a volume of first proppants and then injecting a volume of second proppants for at least two cycles of such alternating injections to form a layered structure in the horizontal or vertical direction of first proppants and second proppants within the fractured subterranean field and distant from a wellbore,
   wherein the second proppant exhibits a higher average crush strength relative to said first proppant,
   wherein the first proppant and the second proppant are substantially the same size,
   wherein the first proppant is an uncoated proppant,
   wherein the second proppant is a resin-coated proppant, and
   wherein the amount of the second proppant is about 10-30% and the amount of the first proppant is about 70-85%.

* * * * *